No. 704,812. Patented July 15, 1902.
G. C. BUSHNELL.
DASHBOARD.
(Application filed Dec. 2, 1901.)
(No Model.)
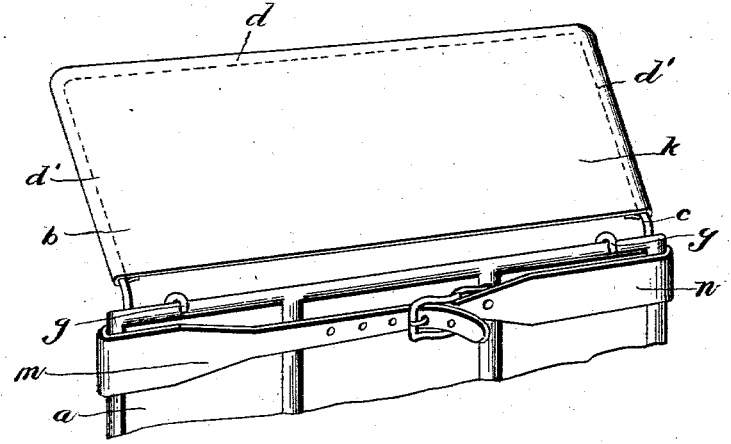
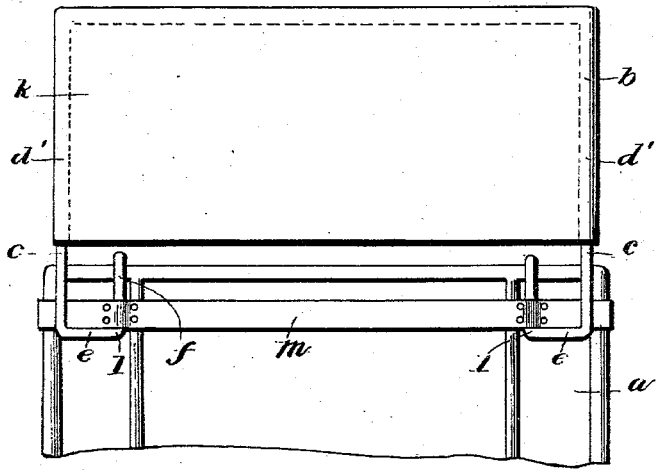
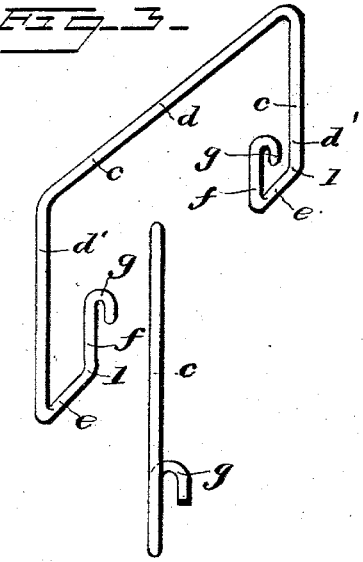
Witnesses
R. A. Boswell
George M. Anderson
Inventor
Glenn C. Bushnell.
By E. W. Anderson
his Attorney
THE NORRIS PETERS CO., PHOTO-LITHO., WASHINGTON, D. C.

UNITED STATES PATENT OFFICE.

GLENN C. BUSHNELL, OF HARTFORD, OHIO.

DASHBOARD.

SPECIFICATION forming part of Letters Patent No. 704,812, dated July 15, 1902.

Application filed December 2, 1901. Serial No. 84,422. (No model.)

*To all whom it may concern:*

Be it known that I, GLENN C. BUSHNELL, a citizen of the United States, and a resident of Hartford, in the county of Trumbull and State of Ohio, have made a certain new and useful Invention in Dashboards; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a perspective view from the rear, showing my invention as applied. Fig. 2 is a front elevation of the same. Fig. 3 illustrates the frame $c$ in detail.

The invention relates to supplementary dashboards; and it consists in the novel construction and combination of devices as hereinafter set forth.

In the accompanying drawings, illustrating the invention, the letter $a$ designates the ordinary or fixed dashboard of a vehicle, and $b$ the supplementary dashboard, which is designed to be placed on the top of the fixed dashboard in muddy weather or when it may be required.

The supplementary dashboard consists of a frame $c$, of heavy wire or rod metal, which extends transversely along the top, this transverse portion $d$ having at its ends angular arms $d'$, which extend downward, terminating in the inward right-angle extensions $e$, which have upwardly-extending braces $f$, terminating in hooks $g$. The frame is covered with light leather, canvas, or other suitable material, this covering $k$ extending from the transverse portion $d$ to the level of the top of the fixed dashboard or to the angles $l$ of the side arms $d$. The angles $l$ are obtuse and are in parallel vertical planes, so that the arms $d'$ are parallel to each other. The right-angle extensions $e$ lie in the same plane and extend from the lower portions of the arms $d'$ toward each other. These right-angle extensions are designed to engage the front surface of the fixed dashboard, their hook ends $g$ engaging the top of said fixed dashboard.

To secure the supplementary dashboard, the straps $m$ and $n$ are provided, these straps being respectively attached to the terminal brace portions $f$ of the frame. When in position on the fixed dashboard, the ends of these straps are carried around the sides of the fixed dashboard and are secured together at its rear surface by means of a suitable buckle, so that the frame is drawn or strained laterally and is not only secured to the fixed dashboard, but has sufficient elasticity to stretch the covering of the supplementary dashboard so that it is taut.

This dashboard attachment is easily placed in position and readily removed and when not in use can be stored on the floor of the vehicle, so as to be out of the way.

Having described this invention, what I claim, and desire to secure by Letters Patent, is—

1. A removable supplementary dashboard, having the angular elastic wire frame terminating in angular bracing extensions, the covering, and the fastening-straps connected to the bracing extensions, substantially as specified.

2. The combination with a fixed dashboard, of the removable supplemental dashboard consisting of the wire frame open at one side, its covering, and the securing-strap connected to the end portions of said frame, substantially as specified.

In testimony whereof I affix my signature in presence of two witnesses.

GLENN C. BUSHNELL.

Witnesses:
ROBERT T. BROWNLEE,
MUNGO BROWNLEE.